United States Patent [19]

Ganser

[11] Patent Number: 4,798,186
[45] Date of Patent: Jan. 17, 1989

[54] FUEL INJECTOR UNIT

[75] Inventor: Marco A. Ganser, Zürich, Switzerland

[73] Assignee: Ganser-Hydromag, Zürich, Switzerland

[21] Appl. No.: 100,949

[22] Filed: Sep. 25, 1987

[30] Foreign Application Priority Data

Sep. 25, 1986 [CH] Switzerland ............ 3836/86

[51] Int. Cl.⁴ .............................................. F02M 39/00
[52] U.S. Cl. ..................................... 123/467; 123/446; 123/458; 239/585
[58] Field of Search ............... 123/467, 506, 446, 447, 123/458, 456; 239/585, 533.12-533.2

[56] References Cited

U.S. PATENT DOCUMENTS

| 3,464,627 | 9/1969 | Huber | 123/467 |
| 3,610,529 | 10/1971 | Huber | 123/467 |
| 3,908,621 | 9/1975 | Hussey | 123/467 |
| 4,448,168 | 5/1984 | Komada | 123/467 |
| 4,545,352 | 10/1985 | Jourde | 123/467 |
| 4,566,416 | 1/1986 | Berchtold | 123/458 |
| 4,603,671 | 8/1987 | Yoshinaga | 123/458 |
| 4,669,429 | 6/1987 | Nishida | 123/458 |

FOREIGN PATENT DOCUMENTS 0228578 7/1987 European Pat. Off. ............ 123/467

434875 4/1967 Switzerland .................. 123/467

Primary Examiner—Carl Stunt Miller
Attorney, Agent, or Firm—Lowe, Price, LeBlanc, Becker & Shur

[57] ABSTRACT

The movement of an injector valve member (52) which closes and temporarily opens discharge orifices (58) communicating with the combustion chamber of an internal combustion engine is controlled by the fuel pressure in a control chamber (72) and by a difference in the pressure forces acting on a piston (60) having two sections (63, 69) with different diameters arranged at one end of the valve member (52). The pressure in the control chamber (72) to control the movement of the valve member (52) is controlled by means of two axially aligned orifices (67, 70) and by a solenoid valve (S) for closing and temporarily opening one of said orifices (70). A member (71) and the top end of the thicker section (69) of the piston (60) define said control chamber (72). Said thicker section (69) guides said member (71) at its inside, while the latter is not guided on its circumference (71b). The thinner section (63) of piston (60) is guided in the injector housing (44). The piston (60) is provided with a bore (65) connecting a chamber (46) communicating with the discharge orifices (58) across the other orifices (67) with the control chamber (72).

9 Claims, 4 Drawing Sheets

FUEL INJECTOR UNIT

TECHNICAL FIELD

The present invention relates to a fuel injector for use in a fuel injection system for internal combustion engines. Such a fuel injector is particularly suited for the direct injection of fuel into the combustion chamber of each cylinder of the internal combustion engine and can be used advantageously in diesel engines.

BACKGROUND AND SUMMARY OF THE INVENTION

Different designs of fuel injection systems with an electromagnetic control of the needle valve of the fuel injector are known and disclosed for example in the following publications: Swiss patent specification No. 434,875; U.S. Pat. Nos. 3,464,627 and 3,610,529; German published patent application No. 3,227,742 (and the corresponding U.S. Pat. No. 4,566,416) as well as European published patent application No. 0 228 578 (and the corresponding U.S. patent application Ser. No. 06/938,396 filed on Dec. 1, 1986). The injectors disclosed in the above mentioned publications are so-called accumulator fuel injectors. It is a characteristic of such accumulator injectors that an accumulator volume or chamber, having a volume substantially larger than the maximum volume of the fuel injected during each injection event, is provided in the injector body upstream of the seat of the injector needle valve. The injection orifices are located downstream of this seat. These orifices communicate with the combustion chamber of the related internal combustion engine. The fuel stored in the accumulator chamber under high pressure is partly discharged through the injection orifices during each injection event with a simultaneous pressure drop in the accumulator chamber. The injector's accumulator chamber communicates with the high pressure fuel supply line of the injection system via a restriction or orifice. The orifice, due to its small flow passage, prevents the formation of noticeable pressure waves in the fuel supply lines during each injection event. Such pressure waves would highly affect the uniform fuel distribution in a multicylinder engine and the stability of the injection events of a single injector from cycle to cycle.

To obtain good engine performance with respect to engine power, efficiency and emissions, a very uniform fuel distribution from cylinder to cylinder must be achieved in a multicylinder engine at each engine operating point. The same holds true for each injector from cycle to cycle. In addition to said orifice between each injector accumulator chamber and the fuel supply line, a plenum fuel chamber communicating with the fuel supply lines of all injectors of the injection system is provided in the above mentioned prior art injection systems in order to obtain a uniform fuel distribution. Due to its relatively large volume, the plenum chamber evens out the pressure pulsations created by the high pressure fuel supply pump and thus creates a constant pressure level for all injectors. However, at different points in the engine operation range different fuel injection pressures are required. As an example, it is advantageous to use a low injection pressure at low engine load and at idling and a high injection pressure at high engine load and speed.

In a passenger car engine, transient speed and load conditions are the most often encountered situations, and the injection system pressure must be rapidly adapted to the varying demand of the driver. It must be possible to rapidly increase and drop the fuel pressure in the plenum chamber. Due to its large volume, this is a difficult task to accomplish.

It is now an object of the present invention to provide a new and improved fuel injector which allows to eliminate the aforementioned plenum chamber while nevertheless maintaining the required uniform fuel distribution at each engine operating point.

This and other objects are accomplished by a fuel injector as claimed in claim 1.

Because of the particular design of the injector needle valve piston of the injector it is also possible to place the accumulator chamber which is normally arranged within the injector body outside of the latter at any suitable location within the high pressure part of the fuel injection system. Said orifice between the injector accumulator chamber and the fuel supply line is eliminated too. Because of the novel design of the injector needle valve piston, it is no longer important that the pressure level in the fuel supply line to each injector remains constant. Pressure pulsations are thus allowed, as long as they are the same for all injectors.

Those and further advantages of the invention become apparent from the following detailed description of various embodiments shown in the drawings.

DETAILED DESCRIPTION OF THE PREFERRED EMBODIMENTS

Figure 1:
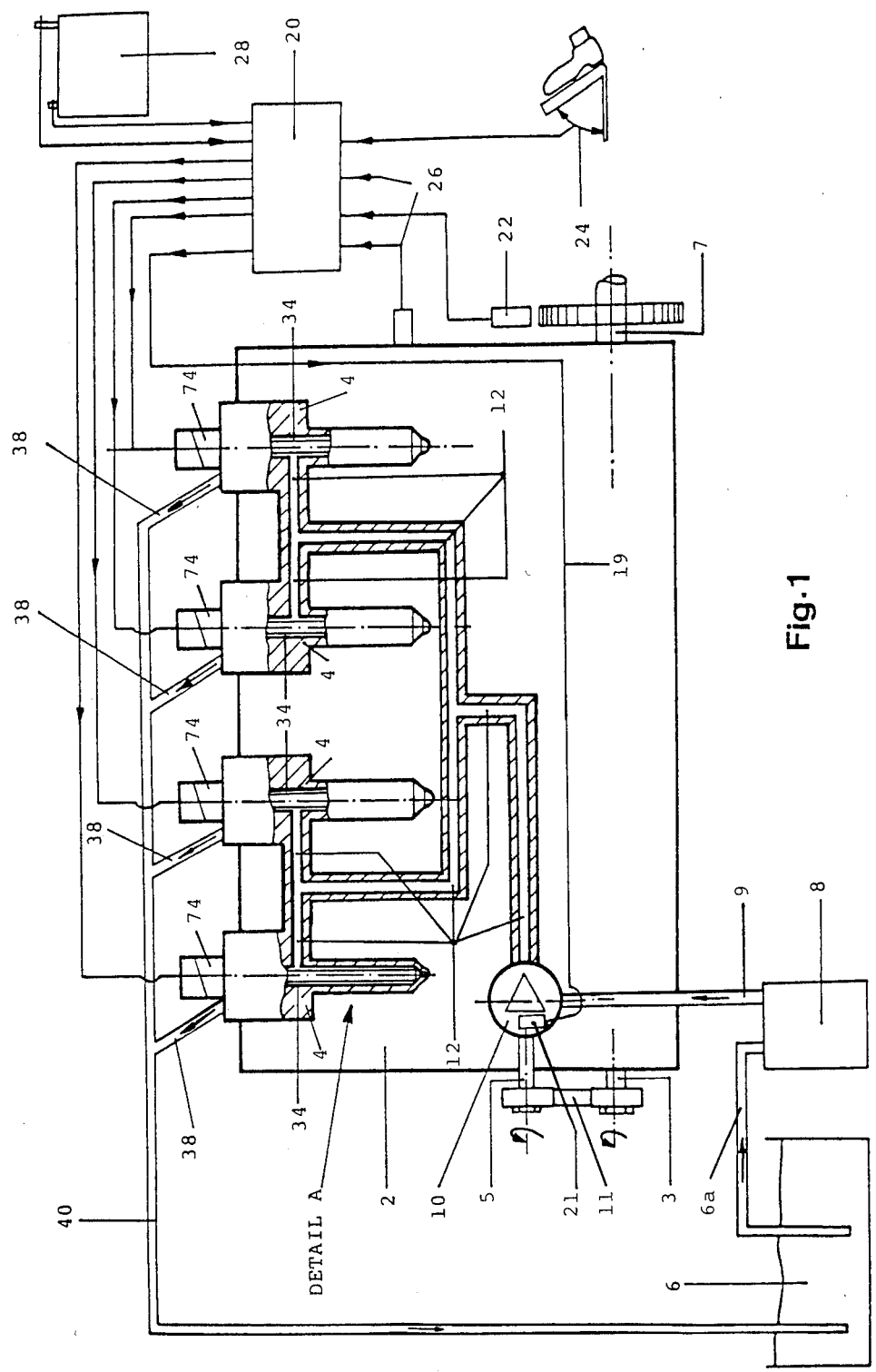
FIG. 1 is a schematic drawing of an electronically controlled fuel injection system incorporating fuel injectors in accordance with the present invention.

Turning to FIG. 1, the electronically controlled injection system is employed in a four cylinder internal combustion engine, designated by the numeral 2. Like numerals are employed to identify the same or like parts throughout all Figures shown. On the upper part of the engine 2 there are placed four electronically controlled fuel injectors 4 to inject the pressurized fuel into the combustion chamber (not shown) of the engine 2. The fuel flows from the fuel tank 6 through a low pressure pipe 6a to a fuel filter 8 and reaches through another low pressure pipe 9 a high pressure pump 10. The high pressure pump 10 can be a one- or muticylinder pump, depending on the specific application. The shaft 5 of pump 10 is driven by a shaft 3 of the engine 2 with a constant drive ratio, for example by means of a gear or a tooth-belt 11. As an important matter, the motion of the pumping plunger or plungers of the pump 10 shall be harmonic and each pumping cycle shall take place over a large angle of rotation of the pump drive shaft 5 and thus also of the engine's crankshaft 7. Since the pumping event takes place over a wide angle of rotation of the crankshaft 7, but the injection event is of a relatively short duration, there is no relationship between the momentary pumping rate of any of the pumping plungers and the injection rate of any of the injectors 4. Nevertheless it is preferred that the injection event of each of the injectors 4 of the injection system takes place during the pumping stroke of any one of the pumping plungers of the pump 10.

The fuel delivered by the pump 10 to the high pressure section of the injection system of FIG. 1, formed by a plurality of high pressure lines 12, can be regulated, depending on the engine operating conditions, within the pump 10 in a manner already employed in known in-line or distributor type fuel injection pumps. As shown by way of example, this regulating process is taken care of by an electronic control unit 20 connected by means of an electrical connection 19 to appropriate actuators 21 placed within the body of the pump 10 (not shown in detail).

The control unit 20 operates also the solenoid 74 of each injector 4. The main input signals to the control unit 20 are the angle of rotation of the crankshaft 7, sensed by means of a pick-up sensor 22 and the position of the throttle pedal 24. Further input signals 26 characteristic for the engine coolant temperature, intake air or boost pressure etc. can be generated as well. The control unit 20 is powered by a battery 28.

The control unit 20 consists of a one-chip microprocessor and the required input and output power modules. The desired relationships between the input signals and the output signals to the injector solenoids 74 and to the actuator 21 of the pump 10 is programmed into the microprocessor. The required data needed to determine the momentary value of the output signals as a function of the momentary input signals are stored in the microprocessor memory. The microprocessor can also be used to perform troubleshooting diagnostics of the engine - and fuel-injection-systems.

The high pressure section of the injection system shown in FIG. 1 consists of the high pressure pipes 12 and of the high pressure section 34 of each injector 4. From each injector 4 a low pressure spill pipe 38 connected to a low pressure fuel released from each injector 4 back to the fuel tank 6.

The design of the high pressure section 34 of each injector 4 will be discussed later when describing FIG. 2 in detail. It is important to mention at this point that each high pressure flow path formed by high pressure pipes 12 connects directly and without any restriction the pump 10 with each injector 4. As shown in one of the injectors 4 (Detail A) a direct and unrestricted hydraulic connection exists between the outlet side of the high pressure pump 10, and the region around the seat of the injector needle valve in the tip of each injector 4 by means of the high pressure pipes 12.

With the above mentioned layout of the high pressure section of the injection system of FIG. 1 consisting of high pressure pipes 12 and of the high pressure section 34 in each injector 4 it is possible to eliminate any fuel plenum chamber as well as an accumulator volume placed within the injector body.

The essential features of the fuel injecton shown are as follows:
the fuel enclosed under high pressure in the lines 12 and section 34 of each injector 4 can flow within this high pressure section in an unhindered, unobstructed way,
the cross sectional areas of each one of the high pressure passages leading from the outlet of the pump 10 to the region around the seat of the injector needle valve of any of the injectors 4 of the injection system is substantially bigger than the total cross sectional area of all injection orifices of on injector 4,
during engine operation the entire high pressure section is permanently pressureized to a pressure substantially equal to the proper injection pressure under given engine running conditions.

It is therefore possible to largely reduce the total high pressure volume of the injection system compared with the prior art injection systems. This allows a fast response during transient operation of the engine 2, which makes the injection system practicable for passenger car application without the need of an overdimensioned pump 10 or of a complex control scheme taking care of the transient operating conditions of the engine 2.

However, due to pressure waves arising in a system as presented, an injector design insensitive to pressure waves must be used in conjunction with this system in order to maintain the desired uniformity of fuel delivery of the injectors 4. A first embodiment of a suitable injector 4 is shown in FIG. 2.

It is furthermore important that the injection system's high pressure section is arranged in such a way that it is symmetrical with respect to the arrangement of the fuel lines 12 as shown in FIG. 1. Accordingly, the time of a pressure wave to travel from anyone of the injectors 4 to the delivery side of the pump 10 or vice-versa will be the same for all injectors.

Figure 2:
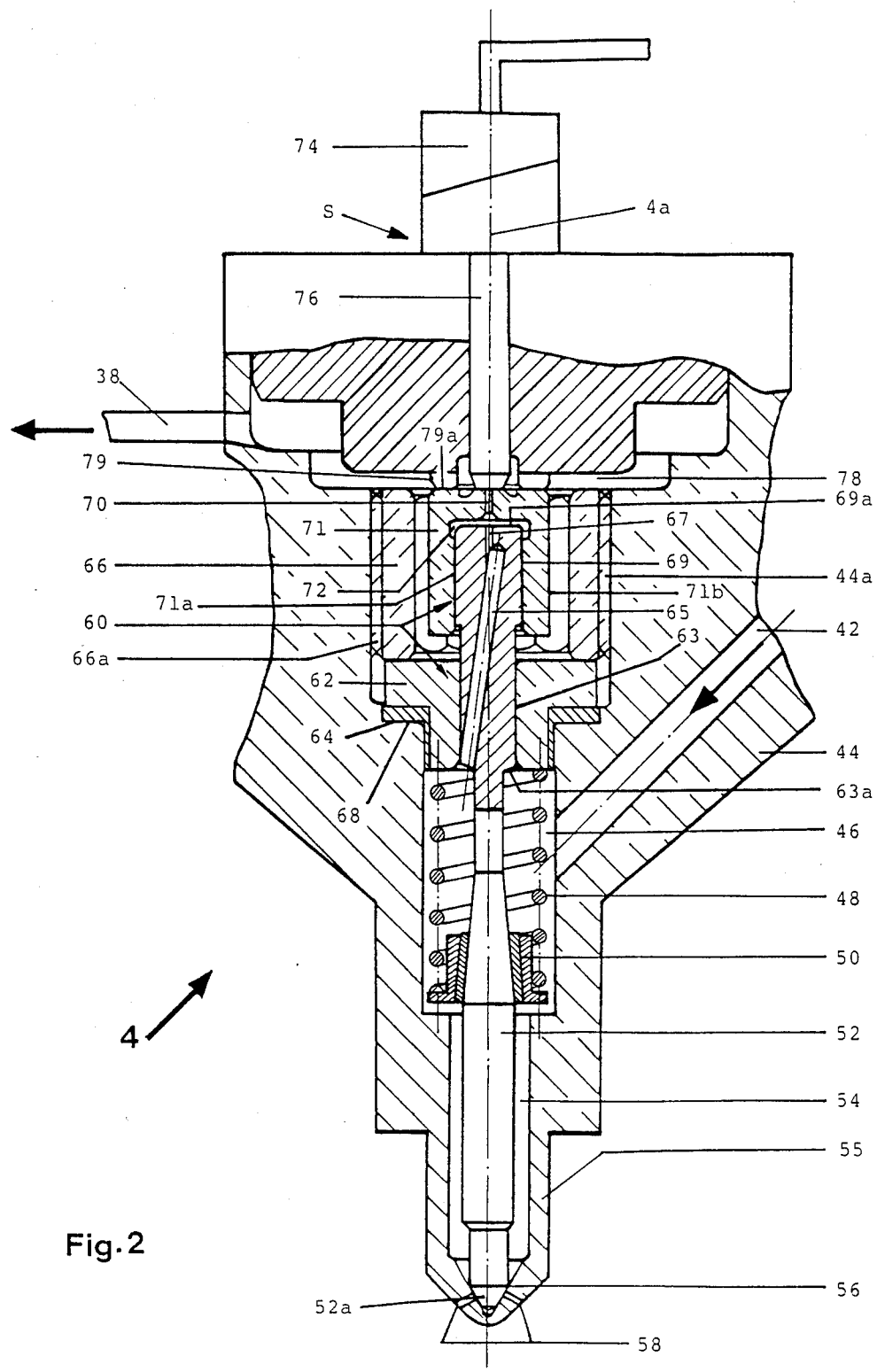
FIG. 2 is an enlarged fragmentary axial sectional view of a fuel injector in accordance with the present invention.

FIG. 2 shows the particular portion of an injector 4 designed according to the principles of the present invention. Such an injector can be employed advantageously in the injection system of FIG. 1. The pressurized fuel coming from the high pressure line 12 of FIG. 1 enters the injector 4 through a bore 42, which is machined into the housing 44 of the injector 4. The bore 42 is connected to a space or chamber 46, in which is placed an injector needle valve spring 48 supported by a spring support 50.

The spring support 50 is carried by an injector needle valve 52, which extends downwards from the space 46 into the injector neck 55 and to a needle valve seat 56. As shown in FIG. 2 the tip 52a of the needle valve 52 is engaged with the valve seat 56 and closes the injection orifices 58, thus preventing pressurized fuel to be injected from the injector 4 through the seat 56 and the injection orifices 58 into the combustion chamber of the related internal combustion engine (not shown). As already mentioned, the cross sectional flow areas of the passages from bore 42 to the valve seat 56 are big compared to the total cross sectional flow area of all injection orifices 58. The needle valve 52 can be momentarily axially shifted in order to produce the injection of a desired quantity of fuel.

In principle the tip 55 can be of any suitable shape. A sac type, a throttle type or a zero sac type tip can be used in conjunction with the present injector 4. In order to reduce the polluant emissions of the related internal combustion engine 2 to a minimum it is an advantage for some engine applications if a zero sac type tip 55 is being used in conjunction with the injector 4. Such an arrangement of tip 55 is shown in FIG. 2, which shows that the needle valve tip 52a closes the orifices 58 when the needle valve tip 52a is engaged with the seat 56, as no intermediate sac volume exists between the needle valve tip 52a and the entrance of anyone of the injection orifices 58.

On the upper end opposite to its tip 52a, the injector needle valve 52 is provided with a needle valve piston 60 having two sections 63, 69 of different outer diameters. The outer diameter of the lower section 63 is tightly matched to the inner diameter of a guide-piece 62. The latter is provided with an enlarged portion which is pressed together with an sealing ring 64 against a shoulder 68 of the injector housing 44 by an internal hexagon-screw 66 thus sealing the high pressure section of the injector 4. The screw 66 is provided with an external thread 66a which engages a matching thread 44a in the housing 44.

The outer diameter of upper section 69 of the needle valve piston 60 is larger than the outer diameter of lower section 63. The needle valve piston 60 with two sections 63, 69 of different outer diameters is firmly connected to the injector needle valve 52, either because it is made of one piece with the injector needle valve 52 as shown in FIG. 2, or by a firm connection between the two parts, for example by means of a press-fitting or by welding the parts together. A bore 65 is provided within the needle valve piston 60. This bore 65 is connected at one end to the high pressure chamber 46 of the injector 4. The other end of bore 65 is connected to a restricted passage or orifice 67 having a substantially smaller cross sectional area than the cross sectional area of bore 65. At the other end, the orifice 67 extends to the top surface 69a of the thicker section 69 of the needle valve piston 60.

The outer diameter of the thicker section 69 is tightly matched to the diameter of an inner bore 71a of a piece 71 which is closed at the upper end which is provided with an orifice 70. Internally the piece 71 defines, together with the thicker section 69 of the needle valve piston 60, a space or chamber 72. Both orifices 67 and 70 are axially aligned and extend in the direction of the longitudinal axis 4a of the injector 4.

A solenoid valve S is provided having a solenoid 74 actuating a valve stem 76. As shown in FIG. 2 the valve stem 76 is closing the outlet of the orifice 70 thus preventing the fuel to flow through the orifice 70 into the neighbouring low pressure region 78 which is connected to the return line 38 (see also in FIG. 1). The piece 71 will be pushed by the fuel pressure in chamber 72 against the flat lower surface 79a of a support 79, which determines the axial position of the piece 71 and guides at the same time the valve stem 76.

As an important matter, the piece 71 is guided in a tight-fit relationship at the wall of its inner bore 71a only by the thicker section 69 of the needle valve piston 60. The piece 71 is not guided at its outer circumference 71b. This allows a substantially leakfree, seal-tight design, and an unhindered axial motion of the injector needle valve 52 during the injection event. If the piece 71 had to be guided also on its outer circumference jamming of the needle valve piston 60 or at least undesired high frictional forces would occur in case all tight fits needed for a tight seal were not perfectly concentrical to one another.

Furthermore in the design of FIG. 2 all injector components can be mounted into the injector housing 44 from the top of the housing 44, simplifying the injector assembly procedure.

The mode of operation of the injection 4 is as follows:

When at a desired point of time the solenoid 74 is energized by an electrical pulse of a predetermined duration, the valve stem 76 is retracted from its seat and the outlet of the orifice 70 is opened. The pressure in the chamber 72 will abruptly drop due to the formation of a single fuel jet in the two aligned orifices 67 and 70.

The fuel pressure acting on the lower surface 63a of the lower section 63 of the injector needle valve piston 60 can now shift the needle valve 52 in its opened position and the injection event begins by the discharge of fuel across the seat 56 and through the injection orifices 58. The release of fuel is the origin of a negative pressure wave which propagates from the injector 4 into the high pressure section of the injection system of FIG. 1.

If the electric pulse to the solenoid 74 is interrupted, the valve stem 76 is shifted back to its seat at the outlet of the orifice 70 by a spring (not shown in FIG. 2). The pressure in the chamber 72 will abruptly rise. Since the top surface 69a of the upper, thicker section 69 is bigger than the lower surface 63 of the lower, thinner section 63 of the needle valve piston 60, a force to quickly reseat the injector needle valve 52 is created. Thus the injection event can always be terminated, even if the fuel pressure in the chamber 46 is equal to the pressure in the chamber 72. The force of the spring 48 is weak compared to forces resulting from the fuel pressure. Even a pressure wave in the system does not disturb the injector's needle valve closing event noticeably. This is not the case with the injector valve disclosed in German published patent application DE No. 32 227 742 where the injector needle valve piston has an uniform outer diameter, and where a pressure wave acting on the underside of the needle valve piston drastically affects the closing behaviour of the injector needle valve and thus the uniformity of fuel delivery. For this reason an accumulator chamber within the injector housing and an orifice between this accumulator and the fuel supply line had to be provided in this pior art construction to ensure a repeatably equal closing behaviour of the injector needle valve.

The mentioned waves have an influence on the shape of the injection rate during the injection event. To make sure that all injectors of a multicylinder engine do have the same performance it will be appropriate to build the high pressure section of the injection system of FIG. 1 symmetrically.

As a matter of fact, fuel injectors making use of the principle of differential pressure are well known, for example from the U.S. Pat. No. 3,610,529. In such prior art solutions the needle valve piston must be divided into two or more parts in order to allow the injector to be assembled, to provide liquid-tight seal and to ensure a reliable performance of the injector. Contrary thereto the present invention enables to manufacture a one-piece injector needle valve piston provided with two different diameters and the installation of the complete injector needle valve with piston into the injector body with no problems regarding liquid tightness or reliable function.

Figure 3:
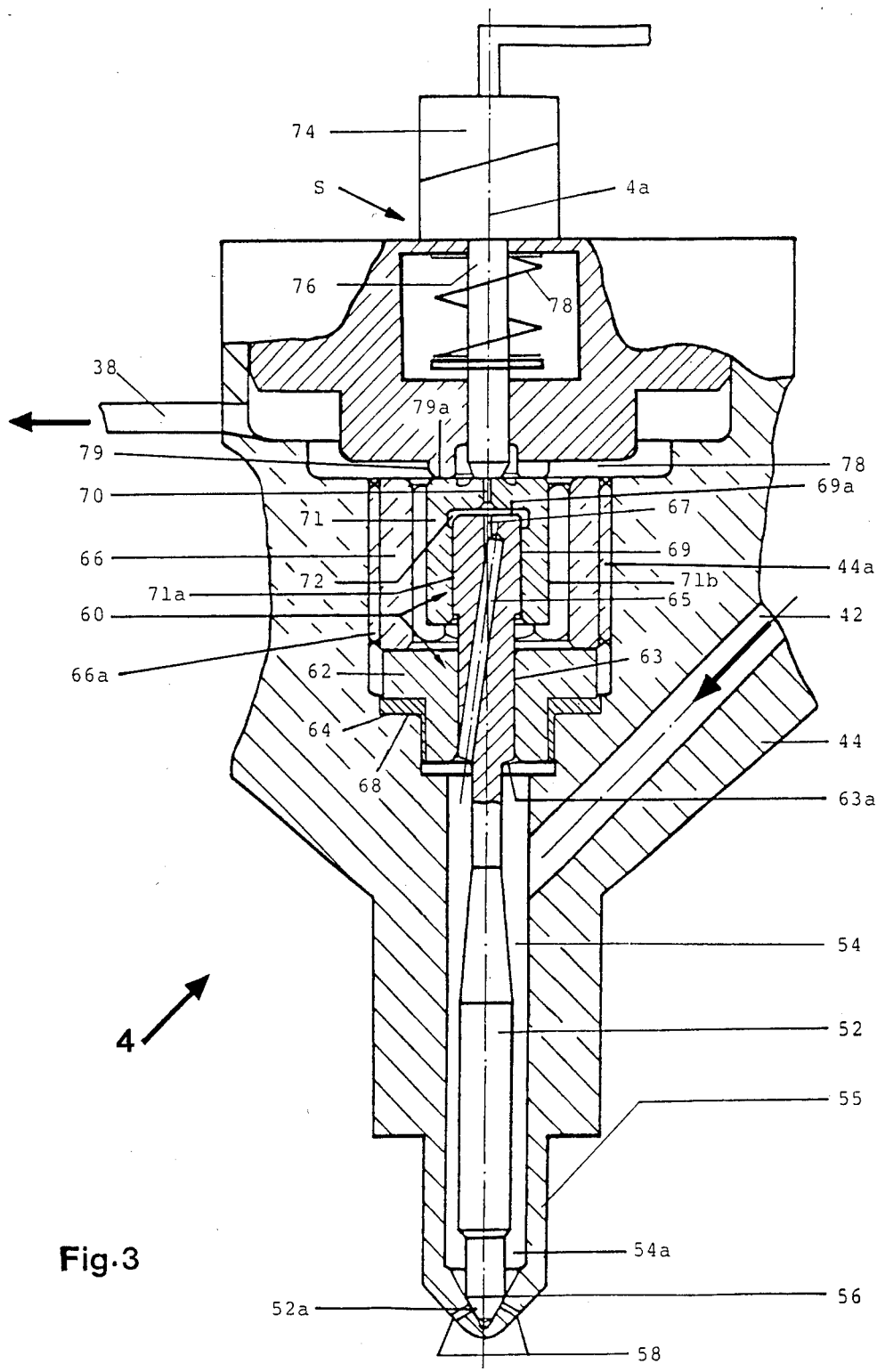
FIG. 3 is an enlarged fragmentary axial sectional view of an alternate embodiment of a fuel injector according to the present invention.

FIG. 3 shows an alternate embodiment of the injector 4 according to the present invention. Comparing this embodiment with the one shown in FIG. 2, one can see that the spring 48 and the spring support 50 have been eliminated in the embodiment of FIG. 3. Instead a bore or chamber 54 extends from the underside 63a of the thinner section 63 of the needle valve piston 60 to the tip 55 and to the region 54a immediately around und upstream the needle valve seat 56. This results in a more compact design of the lower portion of the injector 4.

During engine running conditions the force resulting from the pressurized fuel within the injector 4 provides a closing bias to keep the needle valve 52 seated on its seat 56 inbetween injection events. When the engine 2 is stopped, after a while the fuel pressure in the injection system and thus also within the injector housing 44 will drop to atmospheric pressure. With no spring acting on the needle valve member 52, the needle valve 52 can be opened by the cylinder compression pressure while restarting the engine 2 when the fuel pressure in the injection system is low. This can result in a temporary blowback of air and of solid particles from the engine's cylinder across the injection orifices 58 and the valve seat 56 into the bore 54. In turn the solid particles can contaminate the contact area of the needle valve 52 and injector tip 55 at the common seat 56 with adverse effects to the seal tightness of the seat 56 when the injection system is pressurized.

It is therefore advisable to provide an additional closing biasing force for the injector needle valve 52 in addition to the fuel pressure for the above-mentioned reason. In FIG. 2 this biasing force is provided by the spring 48. Since only the relatively low compression pressure must be compensated for, the force of the spring 48 is weak; typically about 1/10 of the spring force of a conventional injector valve spring where the spring force determines the opening pressure of the injector needle valve member.

In the design of the injector 4 according to the present invention it is possible to eliminate the spring 48 while still maintaining a closing bias for the injector needle valve 52 with no fuel pressure in the injection system. The two fits of the thinner section 63 in the guide-piece 62 and of the thicker section 69 in the piece 71 are tight slide-fits, typically with a clearance of 1 to 3 microns, since the needle valve 52 must be axially shiftable to allow for the momentary injection event. With no fuel pressure in the injector 4 the solenoid valve spring 78 (FIG. 3), by means of the valve stem 76, will push the piece 71 to contact the top end 69a of the thicker section 69 of the needle valve piston 60. The remaining force of the spring 78, reduced by the amount of spring ratio times the travel of the piece 71, will be transmitted to the needle valve 52. By suitable layout of the spring 78 a sufficient closing bias for the injector needle valve 52 can be provided for the case where no fuel pressure is available.

Therefore, the spring 78 (FIG. 3) has two functions, namely a dynamic one when the injector 4 is operating during running conditions of the engine 2 and the solenoid 74 raises the valve stem 76 to allow for the momentary injection events, and a static, safety like funtion, when the engine 2 is not running and the fuel pressure is substantially zero.

The embodiment shown in FIG. 3 is of a more simple design compared to the embodiment shown in FIG. 2. Additionally the lower portion of the injector 4 can more easily be tailored to the space available within the cylinder head of the related internal combustion engine 2.

Figure 4:
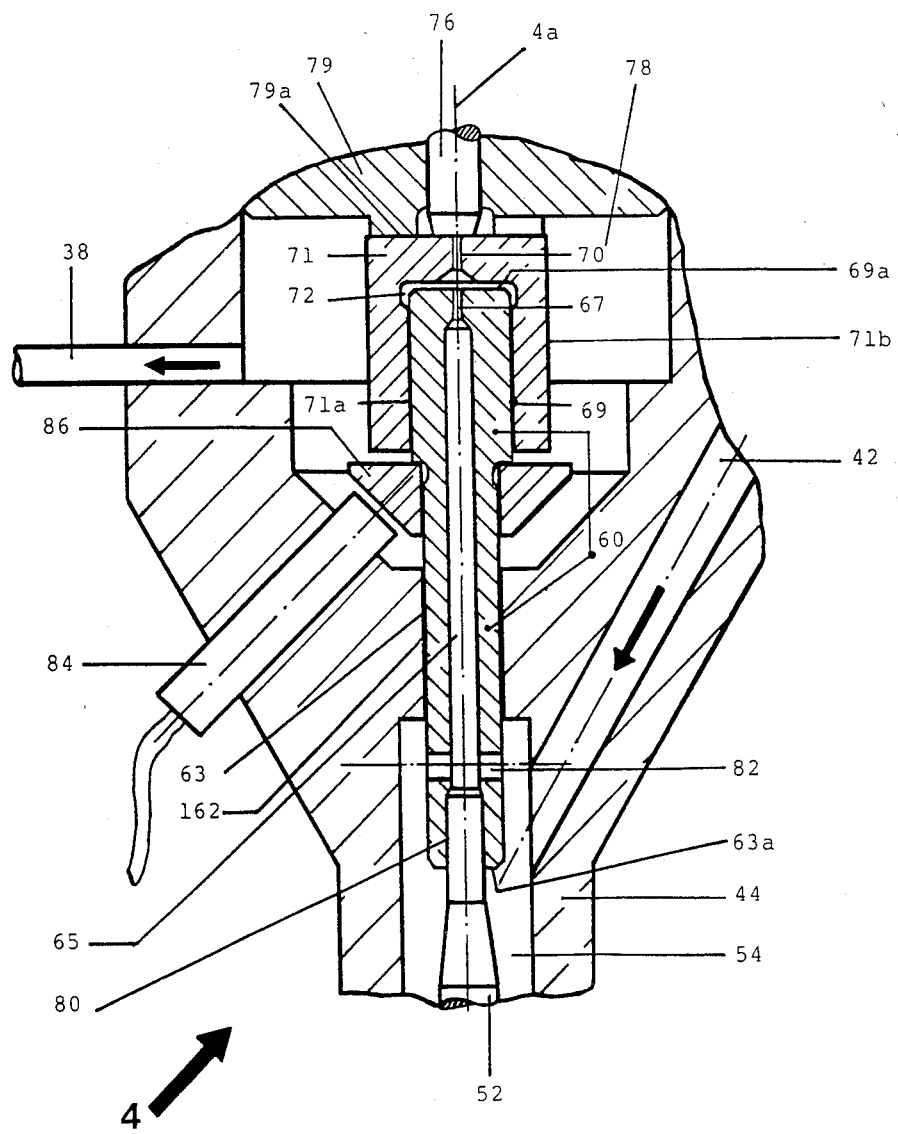
FIG. 4 is an enlarged fragmentary axial sectional view of a second alternate embodiment of a fuel injector in accordance with the present invention.

In a second alternate embodiment of the injector 4 according to the present invention, shown in FIG. 4, the guide 162 for the thinner section 63 of the needle valve piston 60 is machined directly into the injector housing 44. The lower side of the thinner section 63 is press-fitted to the needle valve 52 by means of a press-fit 80. The bore 65, machined on the axis of the needle valve piston 60, connects with a side bore 82 in the lower part of the thinner section 63. In turn the side bore 82 connects to the bore or chamber 54 of the injector 4.

This design allows a more simple machining process of the needle valve piston 60 with respect to the bore 65 in the needle valve piston 60 compared to the solution shown in FIGS. 2 or 3.

In order to increase the timing accuracy of the begin and/or the duration of injection, an increasing number of electronically controlled fuel injection systems detect the motion of the injector needle valve member by means of a sensor. The signals are transmitted by the sensor to an electronic control unit, which can supervise and, if needed, adjust the operating parameters of the fuel injection system to a given optimum.

Since the injector 4 of the present invention will suitably be operated by means of an electronic control unit 20, the needle valve lift measurement during actual engine operation is a desirable feature. In prior art solutions, such as the one disclosed in German published patent application No. 32 277 42, this is a very difficult task to accomplish, since the entire injector needle valve member including the entire needle valve piston are under high fuel pressure during operation of the system.

The injector 4 according to the present invention allows to measure the actual movement of the injector needle valve 52 by placing a sensor in a low pressure region of the injector 4, as shown in FIG. 4.

Such a sensor 84 is placed in the injector body or housing 44 and protrudes into the lower part of the low pressure region 78. A counterpiece 86 to the sensor 84 is attached to the thinner section 63 of the needle valve piston 60 at a region above the upper end of the guide 162 for this thinner section 63. The counterpiece 86 is firmly connected to the needle valve piston 60, for example by means of a press-fit or by another type of firm connection. The needle valve piston 60 and the counterpiece 86 could also be made out of a single piece. The injector needle valve 52, the needle valve piston 60 and the counterpiece 86 will perform the same axial movement during the momentary injection event. This movement is detected by the sensor 84. The top and lower parts of the injector 4 not shown in FIG. 4 are constructed substantially in the same manner as described earlier in connection with FIGS. 2 and 3.

While preferred embodiments of the present invention have been described for purposes of illustration, the foregoing description should not be deemed a limitation of the invetion herein. Accordingly, various modifications, adaptations and alternatives may occur to one skilled in the art without departing from the spirit and scope of the present invention.

I claim:

1. Fuel injector for intermittently injecting fuel into the combustion chamber of an internal combustion engine (2), comprising a housing (44) with a valve seat (56) and at least one discharge orifice (58), an elongated injector valve member (52) provided with a piston member (60) and mounted within the housing (44) for engagement with the valve seat (56) for closing the discharge orifice (58), said injector valve member (52) being shiftable in its axial direction to be momentarily lifted from the valve seat (56) to open the discharge orifice (58) to allow for the injection of a desired quantity of fuel into the combustion chamber of the related internal combustion engine (2), a control chamber (72) being in connection with a fuel supply line (12, 42); the fuel pressure in said control chamber (72) acting upon the piston member (60) of said injector valve member (52) forcing the latter against said valve seat (56), means (67, 70, 74, 76) to quickly reduce and quickly restore the fuel pressure in said control chamber (72) to allow for the momentary axial movement of said injector valve member (52), said means to quickly reduce and restore the fuel pressure in said control chamber (72) comprising a first orifice (67) and a second orifice (70) communicating with one another and opening into said control chamber (72) and electromagnetically controlled valve means (76) for closing and temporarily opening one end of said second orifice (70); said valve piston (60) comprising a first, upper section (69) and a second, lower section (63) integral with said first, upper section (69), the outer diameter of the upper section (69) being bigger than the outer diameter of the second, lower section (63), said second, lower section (63) being guided with a close fit in said injector housing (44), said first, upper section (69) being surrounded by a member (71) and guiding said member (71) in a close fit, said first upper section (69) being movable relative to said member (71), said member (71) being unguided at its circumference (71b) and being provided with said second orifice (70), said control chamber (72) being defined by said member (71) and the end surface (69a) of said first, upper section (69) of said piston member (60), said piston member (60) being provided with a bore (65) extending from the second, lower section (63) to the first, upper section (69), said bore (65) connecting at one end to said first orifice (67) provided in said first, upper section (69), and at the other end being in communication with a chamber (46, 54) provided in said housing (44), said chamber (46, 54) being connected to a high pressure fuel supply line (23, 42), the opening and closing motion of said injector valve member (52) being controlled by the pressure acting upon the bigger end surface (69a) of the first, upper section (69) and the smaller end surface (63a) of the second, lower section (63) independent of the fuel pressure in said chamber (46, 54).

2. Fuel injector according to claim 1, wherein said second, lower section (63) of said piston member (60) is guided with a close fit in a further member (62), said further member (62) being mounted in said housing (44).

3. Fuel injector according to claim 2, wherein said further member (62) is held in place within said housing (44) by a hollow cylindrical screw member (66) provided with an external thread (66a), said thread (66a) being in engagement with an internal thread (44a) machined into the said housing (44).

4. Fuel injector according to claim 1, further comprising a spring (78) to urge said electromagnetically controlled valve means (76) in the closing direction towards said one end of said second orifice (70) during operation of the engine (2), said spring (78) urging said injector valve member (52) in its closed position engaging said valve member seat (56), when the fuel pressure in said chamber (46, 54) is very low or absent, and keeping said injector valve member (52) engaged with said seat (56) against the compression pressure force generated by the engine (2) the force of said spring (78) being transmitted to said injector valve member (52) by means of said electromagnetically controlled valve means (76) said member (71) and said piston element (60).

5. Fuel injector according to claim 1, further comprising sensing means (84, 86) for sensing the movement of said injector valve member (52), said sensing means comprising a first sensing element (84) mounted in said housing (44) and a second sensing element (86) mounted for movement with said injector valve member (52), said second sending element (86) being located in the low pressure section of said housing (44) and opposite said chamber (54) with regard to the guide (162) for the second, lower section (63) of said piston member (60).

6. Fuel injector according to claim 5, wherein said second sensing element (86) is attached to lower, second section (63) of said piston member (60).

7. Fuel injector according to claim 6, wherein said second sensing element (86) is arranged between said guide (162) and said member (71).

8. Fuel injector according to claim 1, wherein said piston member (60) is attached to said injector valve member (52) by means of a fit (80), said bore (65) extending in the direction of the axis (4a) of said piston member (60) and communicating with said space (46, 54) by means of a side bore (82) machined in the second lower section (63) of said piston member (60) and opening into said chamber (46, 54), the cross sectional areas of said bore (65) and of said side bore (82) being substantially bigger than the cross sectional area of said first orifice (67).

9. Fuel injector according to claim 1, wherein said discharge orifice (58) opens into said valve seat (56), said injector valve member (52) being provided with a tip (52a), said tip (52a) directly closes said discharge orifice (58) when said tip is engaging said valve seat (56) in the closed position of said injector valve member (52).

* * * * *